March 31, 1970  H. R. ALBREKTSON  3,503,122

METHOD OF FORMING A TUBULAR ARTICLE

Filed March 29, 1965  5 Sheets-Sheet 1

Inventor
H. RAGNAR ALBREKTSON,
By Jungblut, Melville, Strasser + Foster
Attorneys.

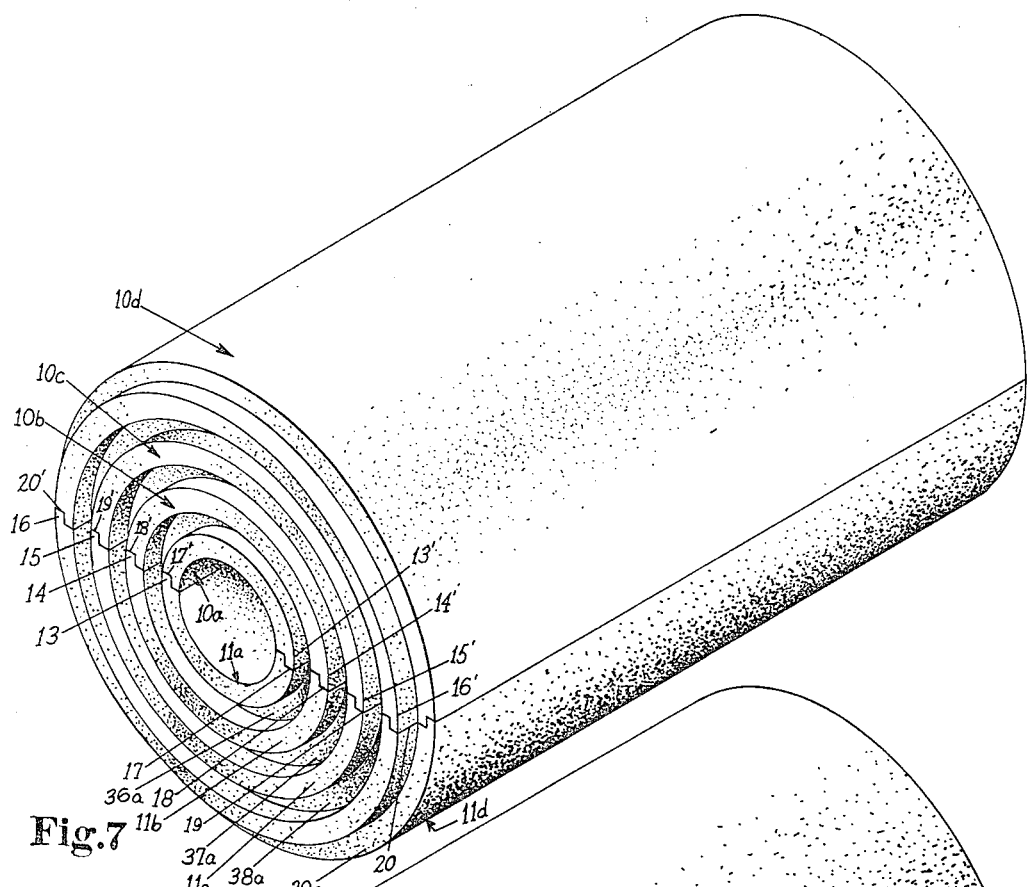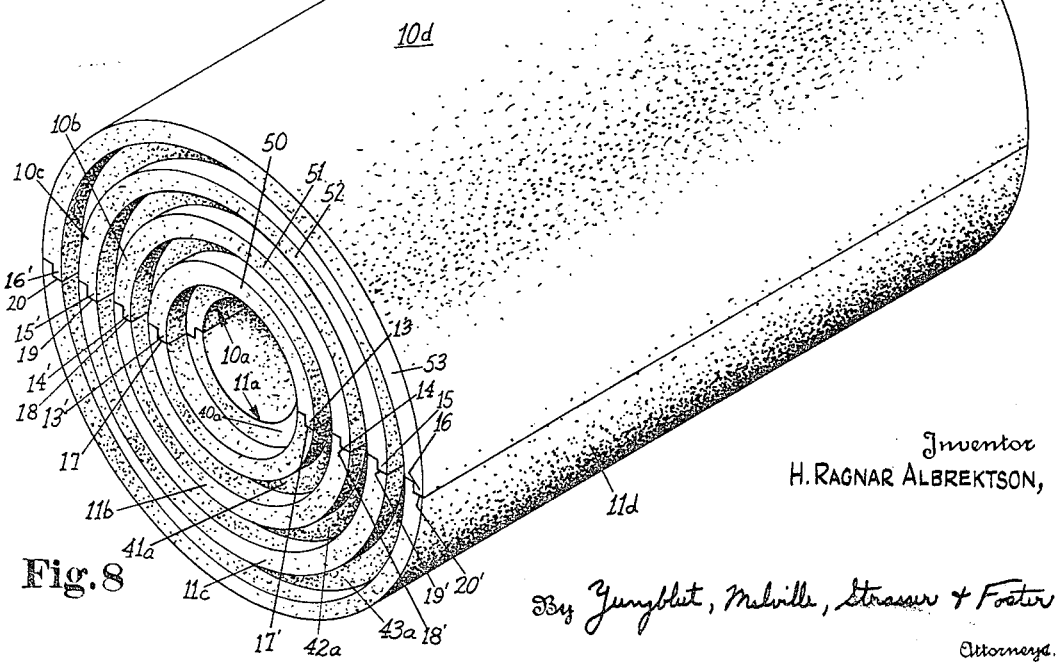

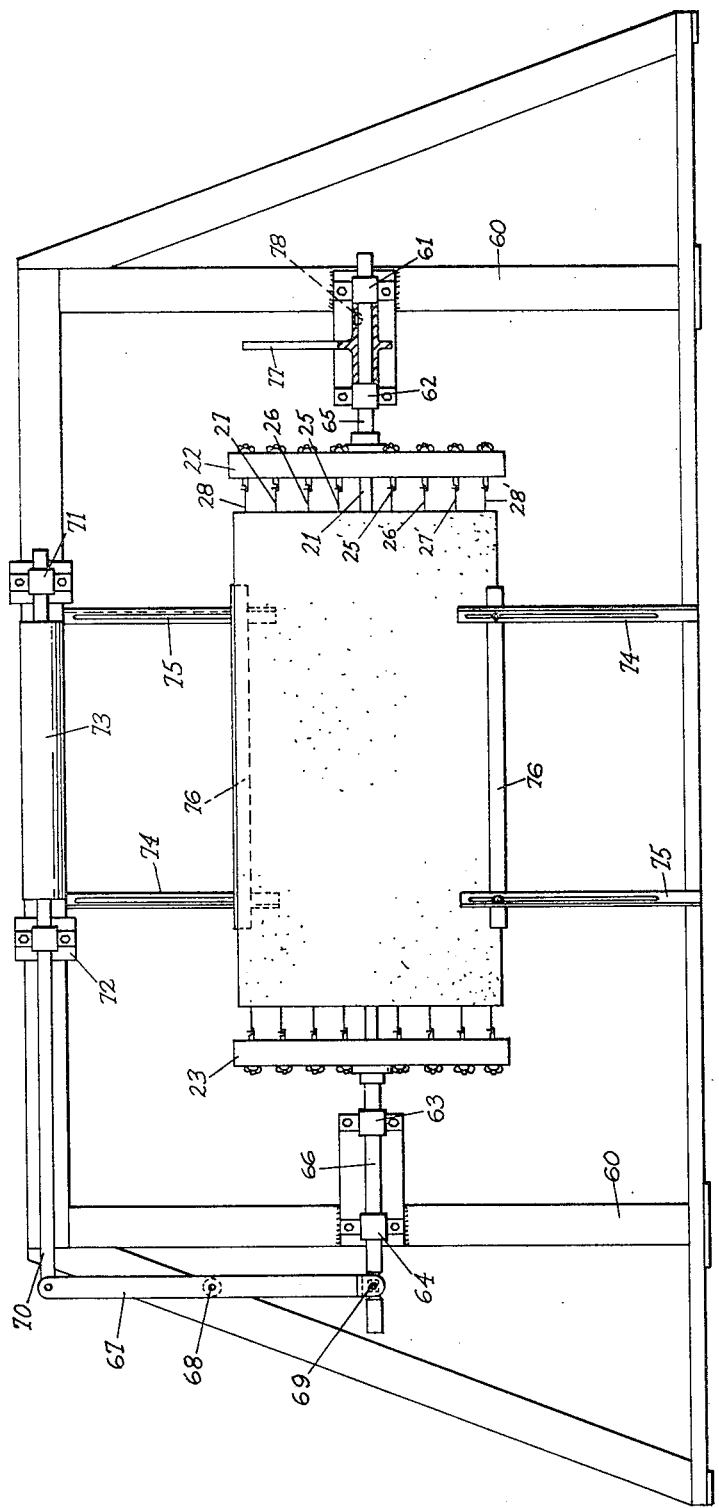
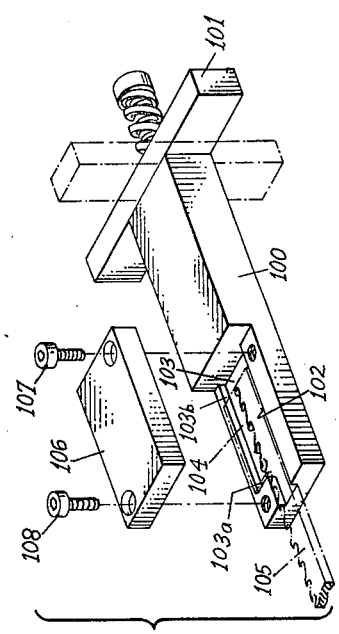
Fig. 9
Fig. 12
Inventor
H. RAGNAR ALBREKTSON

INVENTOR
H. RAGNAR ALBREKTSON,

BY
Yungblut, Melville, Strasser & Foster

ATTORNEYS.

United States Patent Office 3,503,122
Patented Mar. 31, 1970

3,503,122
METHOD OF FORMING A TUBULAR ARTICLE
Helge Ragnar Albrektson, c/o Robin Machine Products, Inc., 1554 Eastern Ave., Covington, Ky. 41014
Filed Mar. 29, 1965, Ser. No. 443,466
Int. Cl. B23p 13/04; B26d 4/00
U.S. Cl. 29—558                           7 Claims

ABSTRACT OF THE DISCLOSURE

A method of forming semi-cylindrical articles wherein a cutting means having several parallel straight blades is inserted between two blocks of cuttable material which are in substantially face to face contact and the cutting means is rotated with respect to the blocks about an axis parallel to the blades.

This invention relates to tubular articles comprised primarily of an expanded, cellular rigid foam, and to a new method and apparatus for producing such article.

It is believed that a complete understanding of the invention will be facilitated by a discussion in terms of a specific article, but it is to be understood that no limitations are to be inferred thereby, except insofar as specifically set forth in the claims appended to this specification.

It is well known that, particularly in industrial installations, insulation of both high and low temperature pipes and conduits is very essential. According to the prior art, this insulation has been accomplished in a number of ways, the simplest of which involves simply wrapping an insulating material, such as asbestos, about the pipe or conduit, and holding the insulating material in place with a suitable covering such as tape, glue, paint, and so on. It is also known that the recently developed expanded, cellular rigid foams, such as for example, urethane, are admirably suited for insulating purposes. Inasmuch as the foam is essentially rigid when expanded, utilization of such a rigid foam for insulating pipes, conduits, and the like requires that the expanded foam be shaped in some manner so that it can be applied to the pipe. At the very least, this means that the foam must have a central opening of a size and shape sufficient to accommodate the pipe or the like to be insulated. It of course follows that both for economy of space, material, and weight, a cylindrical or tubular insulating structure is the most efficient for cylindrical pipe.

Accordingly, it is a primary object of this invention to provide a tubular article consisting essentially of a rigid, expanded foam which can be more easily utilized than any structure or article heretofore available. While this tubular article is well suited for pipe insulation, it will also be understood that in certain cases, it can be used in and of itself to form a hollow conduit or the like.

More specifically, it is an object of this invention to provide a tubular article which may be disassembled into a plurality of substantially identical units; and which may be easily and quickly reassembled, the various components holding themselves together without the need of additional binding, tape, or the like.

Another object is to provide tubular insulating elements, which, when assembled, produce an effective thermal seal with adjacent elements.

As indicated at the outset of this specification, this invention also teaches a new and improved method and apparatus for manufacturing the above described article. It is a primary object of such method and apparatus to provide a means for manufacturing tubular articles consisting primarily of an expanded, cellular rigid foam which involves very little waste of raw materials.

One of the most important objects of this invention is to provide a means and method for simultaneously cutting a block of material into a plurality of nested tubular articles.

A further specific and important object of this invention is to provide a saw means comprising a plurality of saw or cutting elements so arranged as to enable a block of material to be cut into a plurality of nested tubular elements in a single actuation of the means through 180° rotation thereof.

A further object of this method and apparatus is the provision of a vastly more inexpensive manufacturing procedure.

Still another object of this invention is the provision of an apparatus which is readily adjustable, and which can be utilized to produce tubular articles of any desired dimensions.

Still another object of this invention is to provide a method and apparatus for manufacturing tubular articles, such that the finished article can be readily stored and/or transported.

Numerous other objects and advantages of this invention will become apparent to the skilled worker in the art as this specification proceeds. Reference will be made from time to time to the accompanying drawings in which:

FIGURE 7 is a perspective view showing a plurality of nested tubular articles from one end;

FIGURE 8 is a perspective view showing the other end of the nested articles shown in FIGURE 7;

FIGURE 9 is a front elevational view of one apparatus by means of which the method of this invention can be carried out;

FIGURE 12 is an exploded view of one embodiment of a device for holding the serrated blade of this invention.

Figure 1:
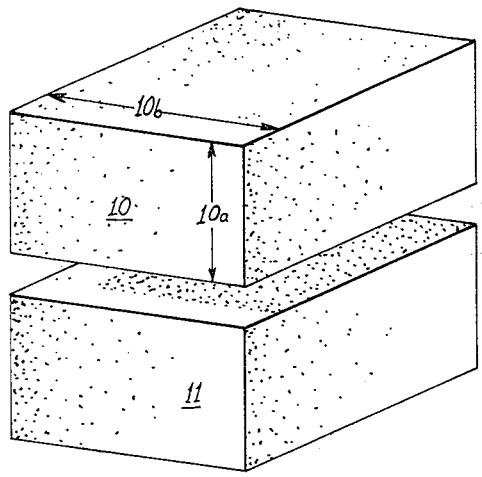
FIGURE 1 is a perspective view showing a pair of rectangular blocks of expanded, rigid foam, prior to the beginning of the process of this invention.

Referring now to FIGURES 1 through 6, the operative steps of the method of this invention will now be described. In FIGURE 1, the starting material is a pair of blocks of a suitable material such as urethane foam indicated at 10 and 11. These blocks are generally rectangular in form, with the height dimension 10a being very slightly more than one-half the width 10b. These blocks may themselves have been cut from larger "buns" of the material. And the material is not to be restricted to urethane; other materials may be used depending on their characteristics, their availability and the end use to which the finished product is to be put.

Figure 2:
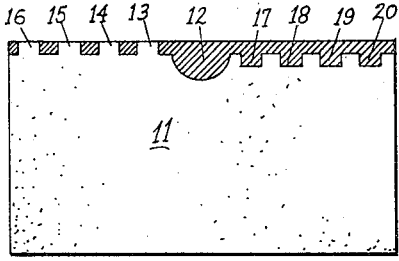
FIGURE 2 is an end elevational view showing one of the rectangular blocks of FIGURE 1 after the completion of the first step of the process of this invention, the material removed being shaded.

Each of the individual blocks 10 and 11 is then passed through a form milling machine, to produce the surface configuration shown in FIGURE 2. (The material removed by this operation is indicated by the shading.) More specifically, this operation will produce a central, semi-cylindrical, longitudinal recess 12, the tongues or tabs 13, 14, 15 and 16, and the grooves or recesses 17, 18, 19, and 20. It will of course be understood that the recess 12, the tongues 13–16 and the grooves 17–20 all extend the full length of the blocks 10 and 11. It will further be apparent that the surfaces of the block on opposite sides of the central recess 12 are mirror images of each other. That is, as shown more clearly in FIGURE 4, a pair of blocks 10 and 11, each having been passed under the same milling cutters, may be placed in face-to-face interlocking relation, the tongues of one block being received in the grooves of the other. (In FIGURE 4, the recess, grooves, and tongues of the block 10 have been given the same reference numerals used in FIGURE 2 for the block 11, with the addition of the prime sign.)

Figure 3:
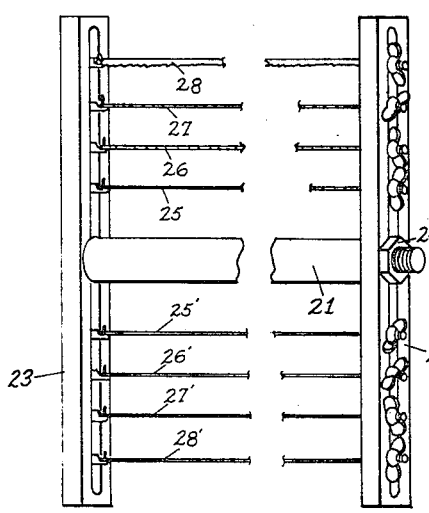
FIGURE 3 is a partial perspective view of the cutting apparatus of this invention.

FIGURE 3 shows in perspective one form of cutting means suitable for use in this process. It includes a central bar or support 21, and the transverse blade mounting arms 22 and 23. The arms 22 and 23 can be secured to the support 21 in any suitable fashion, as by the threaded end and nut 24. Extending between the arms 22 and 23 are a plurality of thin, parallel, spaced apart saw blades. The blades above the support 21 in FIGURE 3 have been designated 25, 26, 27, and 28, while those below the support 21 have been given similar reference numerals with the addition of the prime sign. It should be apparent that each pair of blades is equally spaced from the center of the cutting means itself. It should also be noted at this time that each of the blades is adjustably mounted on the arms 22 and 23. The purposes and advantages of this feature will be explained in more detail hereinafter.

In the next step of the operation of the process of this invention, the cutting means, including the support, the blade mounting arms, and the blades, will be placed between a pair of blocks such as 10 and 11. At this time, it will be apparent that the central support 21 will lie within the recess 12, 12' while the blades 25–28, 25'–28' will lie between the mating sets of tongues and grooves discussed above.

When thus assembled, the entire cutting means is reciprocated in a direction parallel to its longitudinal axis defined by the central support 21. While being so reciprocated, the entire assembly will be rotated 180°. That is, the central support 21 will reciprocate and rotate within the recess 12, while the various saw blades will cut the circular lines indicated by the reference numerals 25a–28a and 25b–28b in FIGURE 5. When the sawing operation has been completed, it will be seen that four nested, concentric tubular articles indicated at 29–29', 30–30', 31–31' and 32–32' have been produced. The only left over material is the four corner portions indicated at 33 and this may, in the case of insulation material, be used for filling crevices and the like, with or without further shaping.

Figure 6:
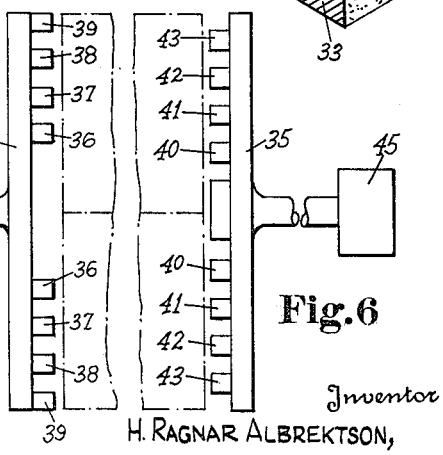
FIGURE 6 is a side elevational view showing the final forming apparatus of this invention.

According to the preferred method of operation of this invention, the final operation may be performed by the apparatus shown in FIGURE 6. This apparatus consists of the cutter bars 34 and 35, provided respectively with the cutting blades 36 through 39 and 40 through 43. Each of these arms 34 and 35 will be driven in rotation by a suitable source of power such as the motors indicated schematically at 44 and 45. This cutting apparatus is rotated about an axis concentric with the axis of the nested tubing, and moved into opposite ends of the nested tubular articles. As is best seen by comparing FIGURES 7 and 8, this will provide mating sets of circular tongue and grooves on opposite ends of the tubular articles.

Figure 4:
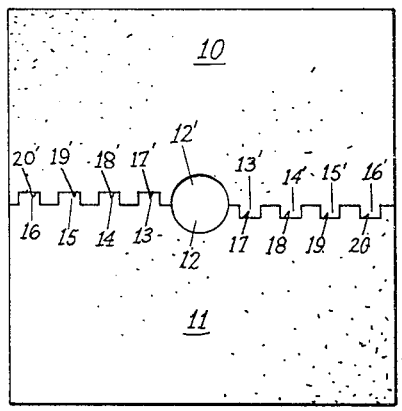
FIGURE 4 is an end elevational view showing a pair of blocks formed as shown in FIGURE 2 assembled.

While the preferred form of the invention contemplates the formation of the circular tongue and grooves as a last operation, it is feasible, and in some cases useful, to cut these tongues and grooves while the assembled blocks are still square in cross-section, such as shown in FIGURE 4. In this manner it may be easier to hold the blocks stationary while a cutting operation takes place.

Referring now to FIGURES 7 and 8, it will be seen that the above briefly described method produces a nested series of tubular articles, each of which is composed of two substantially identical elements designated 10a–11a, 10b–11b, 10c–11c, and 10d–11d. As explained earlier in this specification, the individual blades are adjustably mounted on the rotatable cutting member, in order that the inside and outside diameters of the various tubular articles can be set for any desired dimensions. For example, using starting blocks which when placed in face-to-face relation defined a square approximately 16" on a side, it would be possible to produce an inner tubular article having an inside diameter of 2" and an outside diameter of 4", a second article having an inside diameter of 4" and an outside diameter of 8", another article having an inside diameter of 8" and an outside diameter of 10", and an outermost article having an inside diameter of 10" and an outside diameter of 16". Thus, if a particular job calls for a tubular article having an inside diameter of 10" and a wall thickness of 3" (an outside diameter of 16") the starting stock in cross-section must be a square at least 16" on a side. According to prior art practices, everything removed to form the inside diameter of 10" would be considered scrap. By virtue of the method of this invention, it is possible to produce three additional tubular articles having various inside diameters, so that very little stock is wasted.

Figure 5:
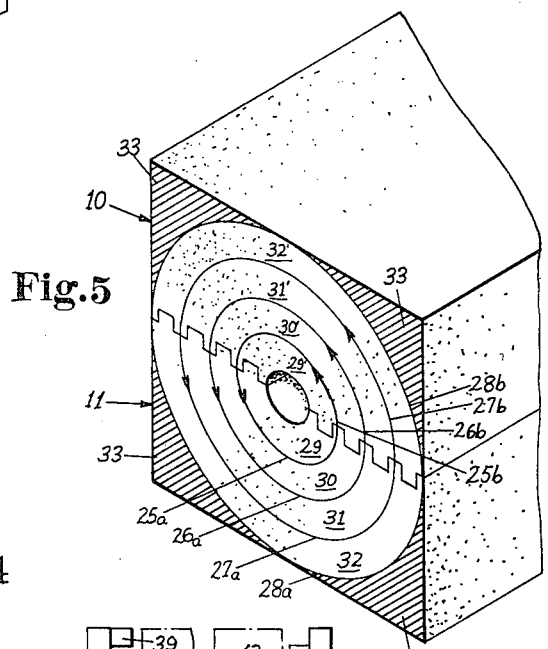
FIGURE 5 is a partial perspective view showing diagrammatically a further step in the operation of the method of this invention.

It will also be seen in FIGURES 7 and 8 that each of the tubular articles is interlocked together by at least one mating tongue and groove. For example, the innermost article includes the grooves 17 and 17' and the mating tongues 13 and 13'. Accordingly, it will be apparent that in the original four milling operations in which the various tongues and grooves are formed, it will be necessary to coordinate the spacing of the tongues and grooves so that at least one mating tongue and groove will be located between successive pairs of the blades when the two blocks are assembled as shown in FIGURES 4 and 5.

The circular tongues and grooves formed on the ends of the nested articles by the cutters shown in FIGURE 6 can also be seen in FIGURES 7 and 8. That is, the end shown in FIGURE 7 includes the circular grooves or recesses 36a, 37a, 38a, and 39a, cut respectively by the cutters 36–39. Similarly, the end shown in FIGURE 40 includes the circular grooves or recesses 40a, 41a, 42a, and 43a, cut respectively by the cutters 40–43. It will be clearly apparent to the skilled worker in the art that these circular tongues or grooves in opposite ends of the article mate; the circular tongue 50 (formed between the grooves 40a and 41a) will be received in the groove 36a, when a pair of tubular articles are placed in end-to-end relation. Similarly, the circular tongue 51 will fit in the circular groove 37a, the tongue 52 in the groove 38a, and the tongue 53 in the groove 39a.

In the preferred embodiment of the invention, the various tongues and grooves will be so sized that a forced fit is necessary to place them together. Therefore, when installing the tubular articles of this invention as insulation over a given pipe, a pair of individual elements can be placed around the pipe and forced together in face-to-face relation, with the tongues received by a forced fit in the mating grooves. These two elements will thus be held in position, at least temporarily. A second pair of semi-cylindrical elements can then be placed around the pipe in the same manner, and then joined in end-to-end relation with the first mentioned set of elements. The installation of course proceeds in this manner until the entire tubular structure has been completed, at which time a more permanent fastening can be effected if desired.

Turning now to FIGURE 9, one embodiment of the invention has been shown in front elevation, with the cutting operation in progress (the cutting assembly has been rotated 90°). The apparatus includes the support frame 60 which includes the bearings 61, 62, 63, 64.

Slidably and rotatably received in these bearings are the shafts 65 and 66 respectively, which are in effect extensions of the central support 21 of the cutting means.

The free end of the shaft 66 will be connected to a suitable means for reciprocating the entire cutting assembly. Reciprocation can be accomplished by motor driven Pitman Motion, pneumatic or hydraulic cylinders, electric solenoid or solenoids, mechanical cam action, or with an ultrasonic transducer. Inasmuch as these various methods for accomplishing reciprocation are entirely conventional, and do not form any part of the instant invention, they have not been shown in this particular figure.

In order to achieve balance for the entire assembly, the arm 67, pivotally mounted at 68, is secured to the shaft 66 as at 69. Pivotally mounted on the other end of the arm 67 is the shaft 70, slidably mounted in the bearings 71 and 72, and carrying the counterweight 73.

A number of material supports, each including the upstanding arms 74 and 75, and the channel shaped crosspiece 76 are provided. The minimum requirement would be two such material supports, located as shown at diametrically opposed corners of the assembled blocks. It is of course within the scope of this invention to provide more of different material support means, it only being necessary that these supports securely hold the blocks of material together, and hold the blocks stationary while the saw assembly is being rotated. (Conceivably, however, the blocks could be reciprocated instead of the saw assembly, if desired.)

Rotation of the saw assembly may be accomplished in a variety of ways. At the present time, manual rotation by means of the crank 77 has been found entirely satisfactory. It will be seen that the crank 77 is keyed to the shaft 65 as at 78 to permit reciprocation of the saw assembly as such assembly is rotated by means of the crank. If desired, it would be relatively easy to provide mechanical or automatic means for turning the cutting assembly 180°.

Figure 10:
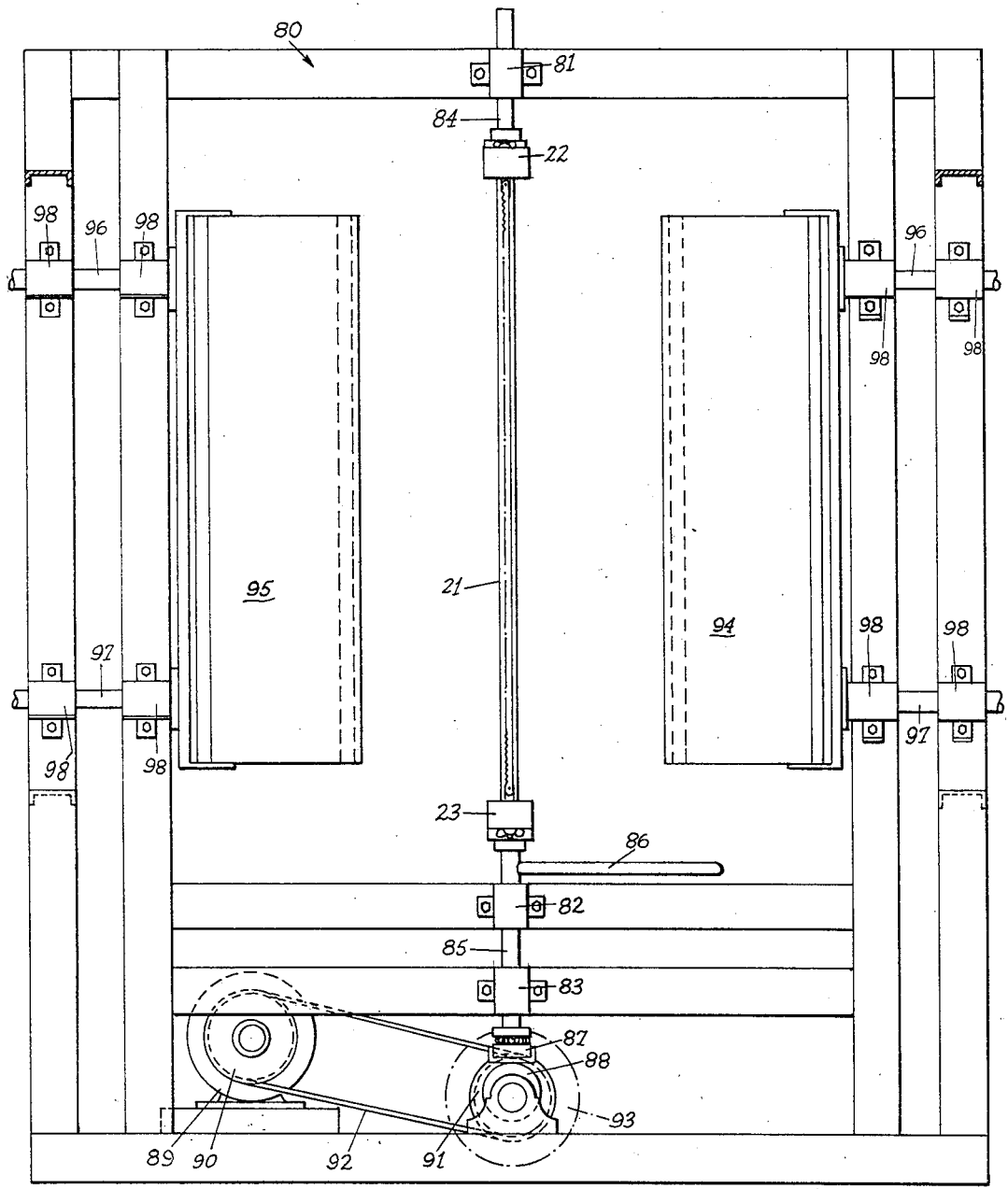
FIGURE 10 is a front elevational view of a modification of the invention.
Figure 11:
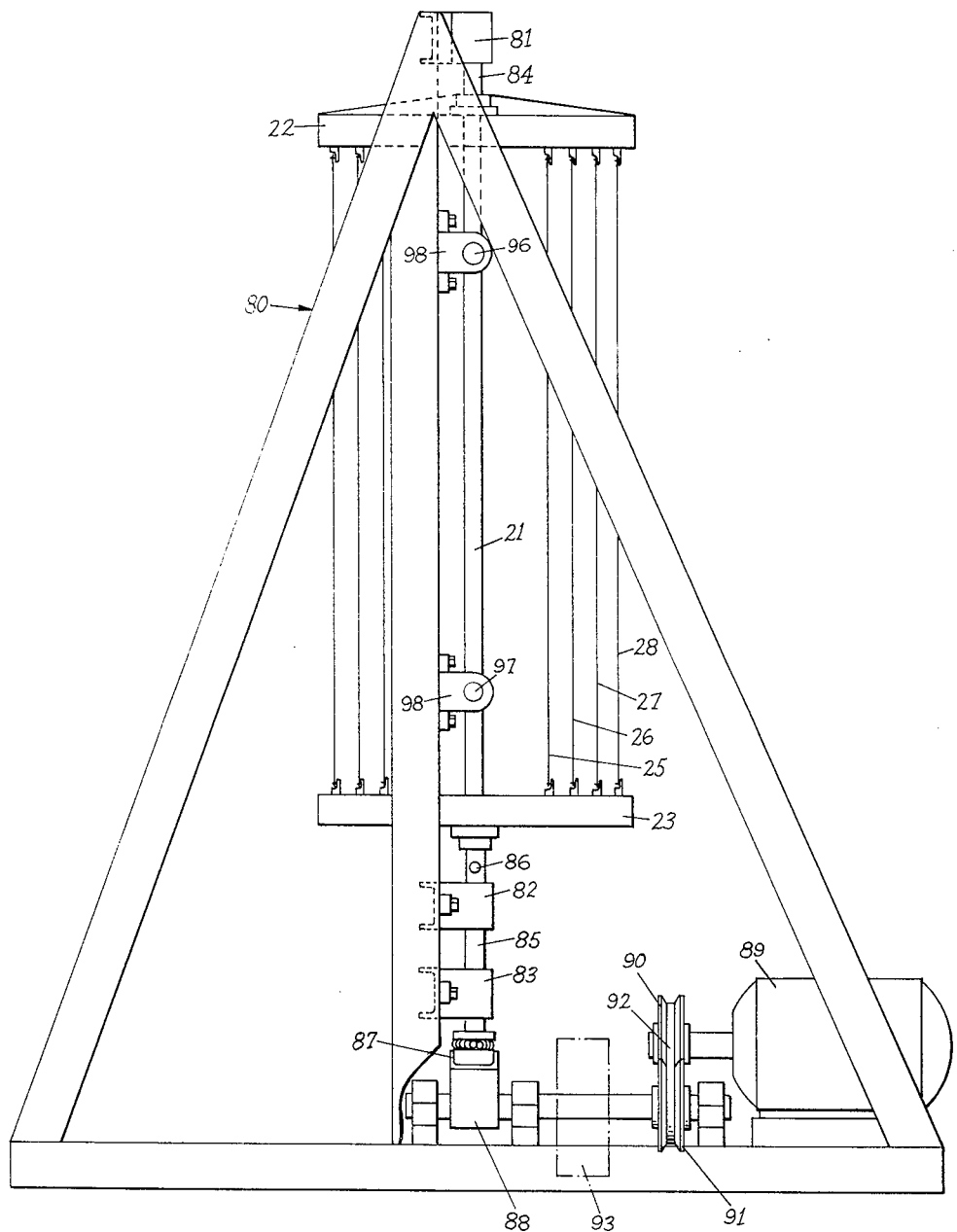
FIGURE 11 is a side elevational view of the apparatus of FIGURE 10.

FIGURES 10 and 11 show in front and side elevations, respectively, another modification of the apparatus of this invention. It will be immediately apparent that in this modification, the cutting means is operated on a generally vertical axis.

This embodiment includes the support frame indicated generally at 80 which mounts the bearings 81, 82, and 83. These bearings again slidably and rotatably receive the shafts 84 and 85 on the ends of the cutting means. Rotation of the cutting means and shafts is once again manually accomplished, this time by the handle 86, which will be keyed to the shaft 85 in the manner described in connection wtih the earlier embodiment.

No discussion has been made thus far of the nature of the cutting blades 25–28, and it is in fact contemplated that various cutting means, some requiring reciprocation and some not, may be utilized. For example, these cutting blades could simply be a straight, thin knife edge, a heated wire, or one of various types of saw blades, such as very thin, flat band saw blades, special blades with a transverse curvature built into them, or a round saw wire.

The embodiment of the invention shown in these figures are particularly adapted for use with a saw type blade, which cuts in one direction only. As is clearly shown in FIGURES 10 and 11, the lower end of the shaft 85 is journaled in a thrust bearing 87, which rides on the cam 88. This cam is driven in rotation by the motor 89, the pulleys 90 and 91, and the belt 92. It will be apparent that this cam serves to force the entire saw assembly upward. It is therefore preferred that the blades 25–28 be oriented to cut on the upstroke. Gravity alone will then be sufficient to effect a return or downward stroke of the entire saw assembly. (Spring means, however, may be employed to aid such return, if necessary.) It will also be noted that a counterweight 93 may be effectively mounted on the same shaft with the cam 88 to counterbalance the assembly.

In this embodiment of the invention, the starting blocks of material are held in place by the vacuum boxes 94 and 95, which are substantially identical. Each of these vacuum boxes is fixedly secured to a pair of shafts 96 and 97, journaled in suitable bearings 98 for sliding movement. The shafts 96 and 97 will be connected to a suitable cylinder (either hydraulic or pneumatic—not shown) by means of whic hthe vacuum boxes can be moved from the posiiton shown in FIGURE 10 to a position in which the blocks of material secured thereto are brought into face-to-face contacting relation. Each of the vacuum boxes 94 and 95 will also be connected to a suitable vacuum pump (not shown).

In operation of this embodiment of the invention, a pair of blocks of suitable material (for example the blocks 10 and 11 shown in FIGURES 2 and 4) are placed on opposite sides of the cutting means, and adjacent respectively the vacuum boxes 94 and 95. At this point, the vacuum pumps are put into operation, and the blocks will be securely held in position. Upon actuation of a suitable switch, the vacuum boxes 94 and 95 will move toward the center, bringing the blocks into face-to-face contacting relation. It should be understood that once this relationship is achieved, the inward force applied to the vacum boxes is released, and they are held statically in this position. In other words, the blocks are held stationary, but are no longer forced toward each other. At this time, the saw unit begins its reciprocation, and is rotated 180° by means of the crank 86. It is believed important in this embodiment of the invention that the inward force not be applied once the cutting operation has begun. That is, the continued application of such force would tend to close the cuts made by the cutting blades, and may cause sufficient friction and binding to prevent the downward or return stroke of the saw unit by gravity alone. This problem could, of course, be overcome by the addition of spring means or the like to accomplish the downward stroke, as earlier indicated, but by means of the operation of the vacuum boxes just described, no such additional force has been found necessary.

Referring briefly to FIGURE 12, the preferred device for holding the serrated cutting blades has been illustrated. By way of explanation, it will be understood that when utilizing very thin saw blades, securely holding these blades under tension is somewhat difficult. According to conventional practice, the ends of the blades are provided with slots or apertures into which mounting pins or the like fit; however, especially when utilizing very thin blades, this tends to weaken the blade. Accordingly, the blade clamp shown in FIGURE 12 includes a support block 100 adapted to fit in the slot seen in FIGURE 3 in the blade mounting arms 22 and 23. At the upper end of the block 100 is the bar 101 which spans the slot, and prevents the block 100 from being withdrawn therethrough.

The lower end of the block 100 is provided with the recess 102 of a width substantially the size of the saw blade to be utilized. A portion of the recess 102 is enlarged as at 103 to a total recess width substantially equal to twice the width of the saw blade.

In order to secure a blade in the recess 102–103, a short portion of the blade (perhaps even a scrap) indicated at 104 is placed in the enlarged portion 103 with its teeth pointing in the opposite direction from that which the teeth of the saw blade 105 itself are pointed. The blade portion 104 abuts a shoulder 103a at one end of the recess, the depth of the recess 103 being substantially equal to the thickness of the blade portion and/or blade. The blade portion 104 also engages a shoulder 103b at the side of the recess 103, the relationship among the recess 103, shoulders 103a and 103b, and the blade portion 104 being such that, when the blade portion 104 within the recess portion 103 abuts the shoulders 103a and 103b, the teeth of the blade portion 104 will project beyond the end of the shoulder 103a into the recess portion 102. The blade 105 is then placed in recess 102 with its teeth engaged with the teeth of the portion of the blade 104. The interdigitating relationship of the teeth of the blade 105 and the portion of the blade 104 provide a very secure grip against axial tension along the saw blade. The two pieces 104–105 may be held in place in any suitable manner, as by the cover plate 106 and the mounting screws 107 and 108.

An additional advantage of this facet of the invention is that these elongated saw blades may be made in any desired or convenient lengths and then simply cut to the size required for any particular job. Conventional blades come in specified lengths with spaced holding holes having a fixed distance between centers; the blades of this invention do not have to be made with such preciseness and, therefore, may be manufactured more economically. And at the same time increased overall strength and holding power are achieved.

It is believed that the foregoing constitutes a full and complete disclosure of this invention. It will be apparent to the skilled worker in the art that numerous modifications and changes may be made without departing from the scope and spirit of this invention. For example, the apparatus and method are not limited to the forming of urethane; other foams or any similar material, or even soft wood (i.e., balsa) can be cut. Accordingly, no limitations are intended except insofar as specifically set forth in the following claims.

The embodiments of the invention in which an exclusive property or privilege is claimed are defined as follows:

1. The method of forming a tubular article comprising the steps of:
   (a) providing a cutting means having a plurality of substantially parallel straight blades;
   (b) placing said cutting means between a pair of blocks of cuttable material which are in substantially face-to-face contact; and
   (c) rotating said cutting means with respect to said blocks, about an axis parallel to said blades, whereby to produce at least two semi-cylindrical elements.

2. The method claimed in claim 1 including the steps of forming a central semi-cylindrical, longitudinal recess in each of the mating faces of said block.

3. The method claimed in claim 1 wherein said blades of said cutting means are equally spaced on opposite sides of the center axis of said cutting means, and wherein said cutting means is rotated 180° with respect to said blocks.

4. The method claimed in claim 1 including the step of forming a plurality of tongues and grooves on each of the mating faces of said blocks, said tongues and grooves being spaced whereby said blocks may be placed in face-to-face relation with said cutting means therebetween, and with said tongues and grooves engaged in one another.

5. The method claimed in claim 4 wherein said tongues and grooves are spaced intermediate said blades, whereby each said cylindrical element includes at least two mating tongues and grooves.

6. The method claimed in claim 5 including the step of forming mating sets of circular tongues and grooves in opposite ends of said blocks, and concentric with the longitudinal axis of said blocks.

7. A method of making nested tubing comprising the steps of:
   (a) providing a cutting means having a longitudinal axis and at least two blades on each side of said axis, said blades being parallel to each other and defining substantially a single plane;
   (b) placing a pair of blocks of cuttable material in face-to-face contacting relation with said cutting means therebetween; and
   (c) rotating said cutting means 180° with respect to said blocks.

References Cited
UNITED STATES PATENTS

| | | | |
|---|---|---|---|
| 2,749,608 | 6/1956 | Siemer | 29—558 X |
| 2,780,896 | 2/1957 | Jaye | 143—85 X |
| 2,809,680 | 10/1957 | Nethery et al. | 143—85 X |
| 2,948,085 | 8/1960 | Casady | 51—73 X |
| 3,333,494 | 8/1967 | Smith | 83—1 |
| 3,060,779 | 10/1962 | Taft. | |

JOHN F. CAMPBELL, Primary Examiner

D. C. REILEY, Assistant Examiner

U.S. Cl. X.R.

51—73; 83—4; 143—85; 144—23